United States Patent [19]

Dean, II

[11] Patent Number: 4,823,152

[45] Date of Patent: Apr. 18, 1989

[54] TRANSFER CORONA SHIELD

[75] Inventor: Walter C. Dean, II, Simsbury, Conn.

[73] Assignee: Moore Business Forms, Inc., Grand Island, N.Y.

[21] Appl. No.: 131,769

[22] Filed: Dec. 11, 1987

[51] Int. Cl.[4] .............................................. G01D 15/00
[52] U.S. Cl. ............................... 346/160.1; 346/153.1
[58] Field of Search .................. 346/160.1, 153.1, 150; 355/3 TR, 3 CH, 3 TE, 30 D, 3 R, 14 CH, 14 TR, 14 D

[56] References Cited

U.S. PATENT DOCUMENTS 4,544,262 10/1985 Kanemitsu et al. .............. 355/3 TR

*Primary Examiner*—Arthur G. Evans
*Attorney, Agent, or Firm*—Nixon & Vanderhye

[57] ABSTRACT

In an electrographic printer, a resilient dielectric shield provides contact engagement across a paper sheet moving in synchronism with a dielectric belt at an upstream boundary of a toner transfer zone to prevent the paper which is not yet in contact with the image belt from being exposed to the electric field of a transfer corona.

15 Claims, 3 Drawing Sheets

TRANSFER CORONA SHIELD

FIELD OF THE INVENTION

This invention generally relates to non-impact direct charge deposition electrographic printing apparatus and is more particularly directed to a dielectric shield for such apparatus for improving the quality of images transferred from a charged dielectric belt to a paper surface.

BACKGROUND OF THE INVENTION

Non-impact offset printers using an electrically charged wire to transfer toner to a paper surface are known. A dielectric belt is provided with a conductive coating underneath the dielectric material and is arranged in a tensioned endless loop. The charge on the belt is selectively modified by a print head to attract toner to create a latent image. Movement of the belt around its loop transfers the image to a so-called wrap area or toner transfer zone in which the belt is held in intimate contact with a paper surface. The toner transfer zone is exposed to an electric field of a wire called a transfer corona which causes an electric charge to accumulate in the paper. Toner in the form of an image remains on the paper after separation from the dielectric belt and is subsequently fixed onto the paper such as by application of beat at a fusing station. The belt later is cleaned of residual toner and electrically conditioned for re-use at the print head.

Attraction of toner to paper by the transfer corona requires that the paper surface be moving in synchronism with the belt and in direct contact with the latent image on the belt during exposure to the electric field of the transfer corona. If the electric field builds up on the paper in the area before the toner transfer zone, such premature exposure of paper to the corona prior to paper contact with the toner and belt causes toner to lift from the belt in an unconfined cloud.

Depending upon the length of such premature exposure, the sharpness of the latent image on the belt may be lost prior to exposure in the toner transfer zone where the belt and paper are in contact. The consequence is a loss of quality of the printed image on the paper.

Known approaches to controlling exposure of the latent image on the belt have been largely directed to the use of an extension of a corona shell to block the electric field of the corona wire in the non-contact area. However, operation of the printer desirably requires lifting paper from the belt in the toner transfer zone so that the paper can be stopped at the end of a printing cycle while the image belt continues to move. Known corona shell extensions are fixed relative to the corona wire, and a gap consequently exists between the corona shell extension and belt at a point prior to the entrance of the belt to the toner transfer zone. Therefore, the possiblity of premature exposure of paper to the corona remains, and image quality is degraded by any unintended transfer of toner prior to contact of the belt and toner with the paper surface.

OBJECTS OF THE INVENTION

It is a principal object of this invention to provide improved image quality produced by non-impact direct charge deposition electrographic printers by eliminating undesired premature transfer of toner to a paper surface.

It is a further object of this invention to provide improved image quality of such electrographic printers while retaining the ability of such machines to lift paper from the toner transfer zone and stop the paper while the image belt continues to move at the end of a printing cycle.

Other objects will be in part obvious and in part pointed out in more detail hereinafter.

A better understanding of the objects, advantages, features, properties and relations of the invention will be obtained from the following detailed description and accompanying drawings which set forth an illustrative embodiment and are indicative of the ways in which the principle of the invention are employed.

SUMMARY OF THE INVENTION

The present invention, in its simplest form, provides a dielectric belt having a toner-carrying image surface supported by an arcuate surface, means for feeding a continuous strip of paper along a path of paper movement in synchronism with the dielectric belt, a corona device for providing an electric field to transfer toner from the belt to the paper with the corona device in adjacent aligned relation with a toner transfer zone. A dielectric shield is featured in contact with the paper between the corona device and the path of paper movement. The toner transfer zone is defined by the belt and paper in coextensively wrapped relation to the arcuate surface with the paper in intimate contact engagement with the toner-carrying surface of the image belt. The dielectric shield is movable into direct contact engagement with the paper in the toner transfer zone to completely block the corona electric field from an adjacent upstream non-contact region of paper being fed to the toner transfer zone.

DETAILED DESCRIPTION OF THE INVENTION

Figure 1:
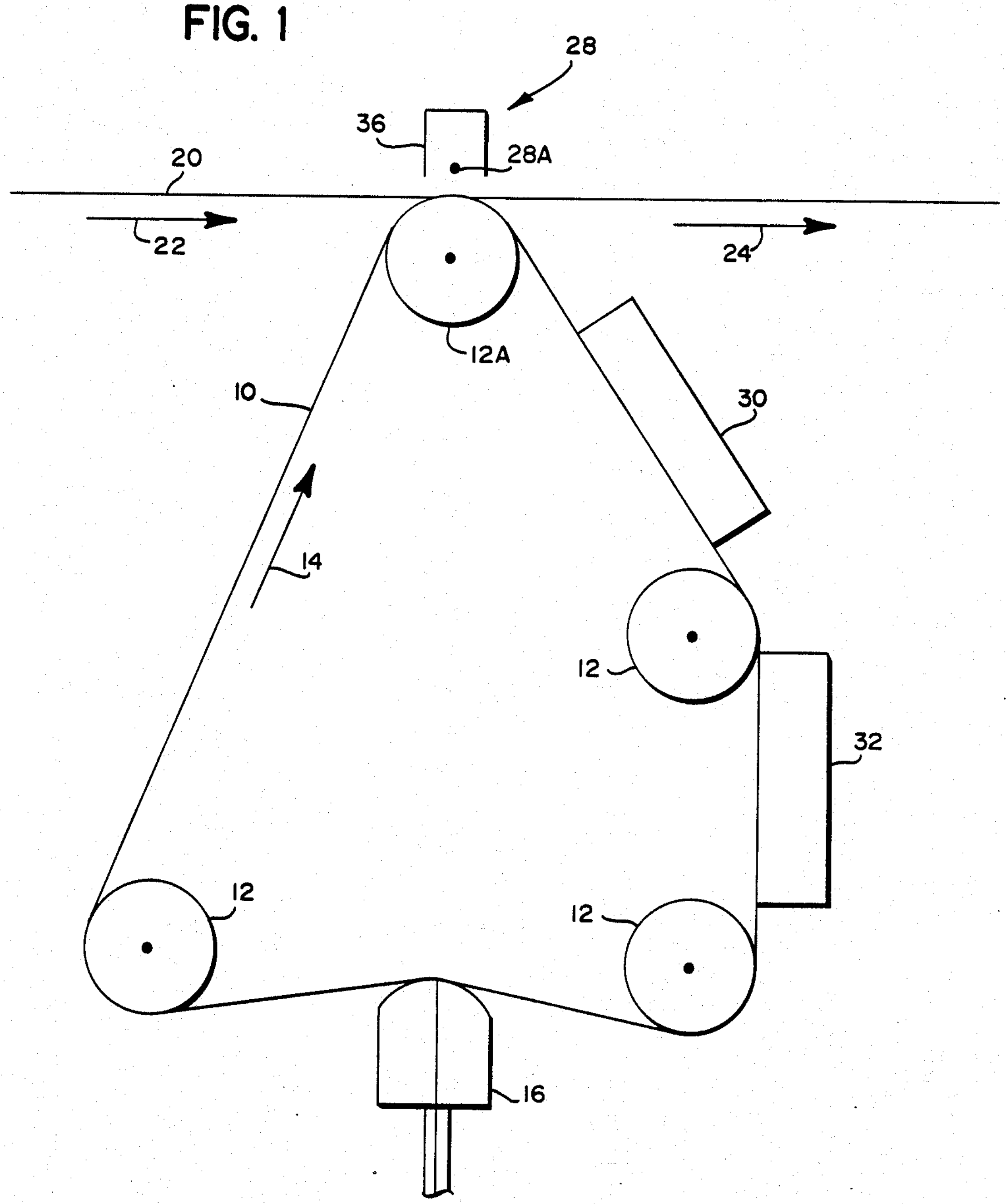
FIG. 1 schematically illustrates an electrographic printer of a type which can incorporate this invention.

Turning first to FIG. 1 and the schematic illustration of a non-impact, direct charge deposition electrographic printer including the present invention in a preferred embodiment, a suitable dielectric image endless loop belt 10 (such as that shown in co-pending United States of America application Ser. No. 07/131,828 entitled Belt and Belt Support Drive for Non-Impact Direct Charge Electrographic Printer and assigned to the assignee of the present invention) is supported on a plurality of rollers 12, one or more of which may be driven to produce movement of belt 10 in the direction of arrow 14. A print head 16 of the preferred embodiment of this apparatus is preferably of a type disclosed in my U.S. of America Pat. No. 4,638,339 entltled "ELECTROGRAPHIC CHARGE DEPOSITION APPARATUS", issued Jan. 20, 1987 and assigned to the assignee of the present invention. Print head 16 serves to create an electrostatic image on belt 10 in accordance with the voltages applied to pins of print head 16.

Figure 2:
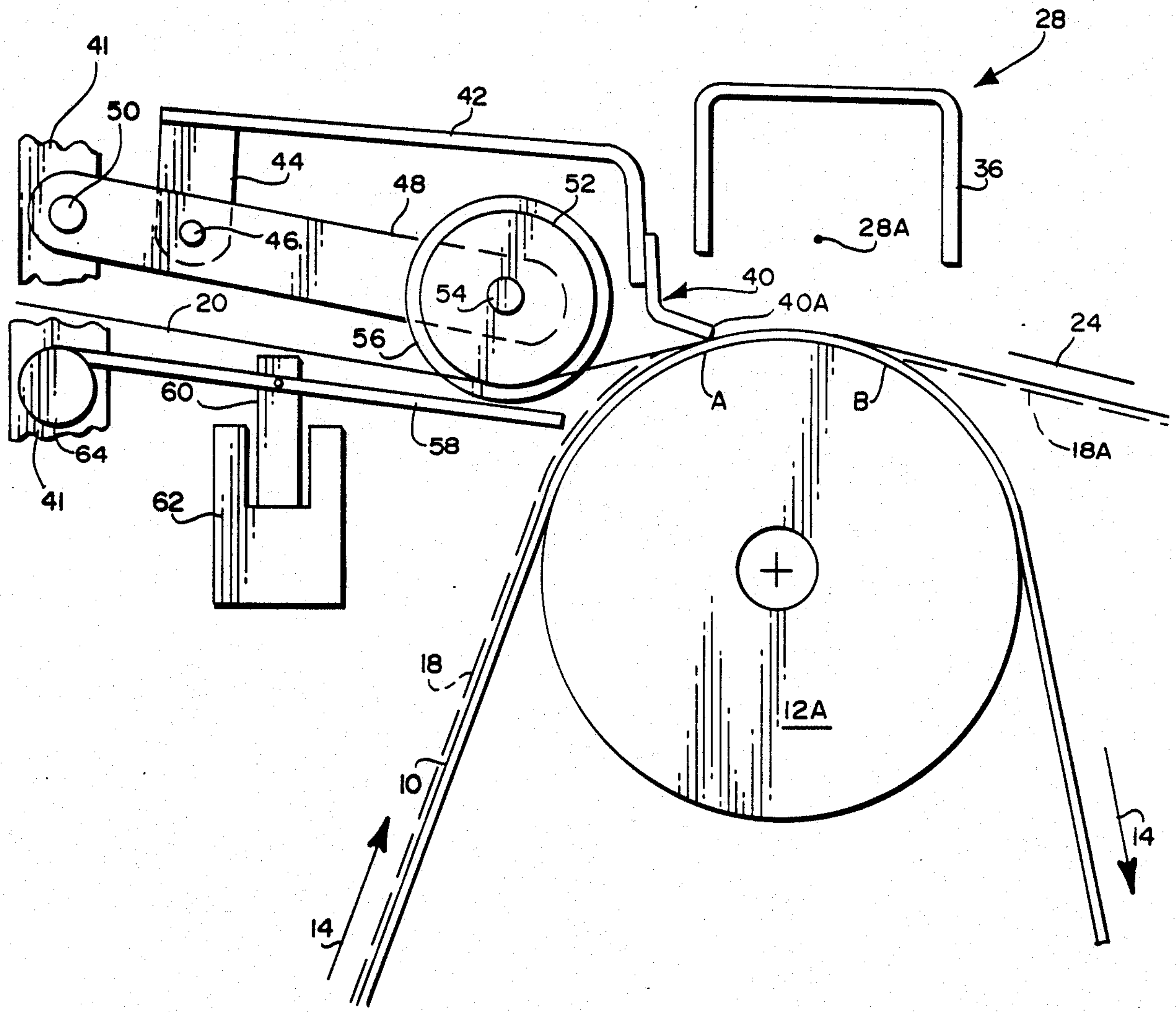
FIG. 2 is a side view of a transfer corona shield of this invention is an operative position.

In accordance with conventional techniques, the belt passes through the print head 16 in which electric impulses transcribe a latent image on the belt 10 by electrically charging selected portions of the dielectric material of the belt. A powder or toner (18 in FIGS. 2 and 3), oppositely charged to latent images retained on the dielectric belt 10, is brought in close proximity to the charged surface so that toner 18 is attracted to the belt and assumes the form of latent images of the electric charges therein. A continuous sheet of paper 20 is suitably driven in the direction of arrows 22 and 24 so as to pass roller 12A which roller is directly opposite and supportive of belt 10 at transfer corona 28. After an image has been transferred to paper 20, belt 10 continues to cleaning station 30.

Following cleaning, dielectric belt 10 continues through conditioning station 32 to prepare dielectric belt 10 to receive the image from print head 16, which conditioning station is preferably constructed in accordance with co-pending application Ser. No. 07/131,928 entitled "CONDITIONING APPARATUS FOR NON-IMPACT, DIRECT CHARGE ELECTROGRAPHIC PRINTER BELT" and assigned to the assignee of this invention. In accordance with conventional techniques, paper 20 with the image transferred thereto by the transfer corona 28, continues to a suitable image fixing or fusing station (not shown) which apparatus can be constructed in accordance with U.S. of America Pat. No. 4,642,661 entitled "PRINTER WITH DRIVE ON SWINGING PLATFORM" and assigned to the assignee of the present invention.

As described, the dielectric belt 10 carries the toner 18 in latent images from the print head 16 to belt roller 12A located directly beneath transfer corona 28. The continuous strip of paper 20 is directed to a wrap area or toner transfer zone (FIG. 2) which begins at a point A where the paper 20 first contacts the dielectric belt 10 and ends at a point B where the paper 20 separates from the belt 10. The toner 18 on the belt 10 becomes trapped in the toner transfer zone (between points A and B) between the belt and paper 20 as the paper contacts the belt 10 at the beginning of the toner transfer zone at point A. The paper and belt do not move relative to each other in the toner transfer zone but are held together with the belt in intimate contact with the belt roller 12A located directly beneath the transfer corona 28. While the paper and belt are in such contact, the paper 20 lies between the belt 10 and transfer corona 28. The electric field of corona wire 28A causes an electric charge to accumulate in the paper 20 while the paper is held in contact with the belt. The electric charge of the paper 20 is greater than that of the belt 10 and consequently, when the paper and belt separate, the toner remains in contact with the paper surface (such as at 18A in FIG. 2) and retains the latent image of the charge originally imparted to the dielectric belt 10 at the print head 16.

The electric field of the charged corona wire 28A normally is confined only by a corona shell 36 or by some dielectric material. If the paper 20 is exposed to the corona wire 28A prior to contact between the paper 20 and dielectric belt 10 in the toner transfer zone, charge which accumulates on paper 20 during that exposure will attract toner 18 from the latent image on the belt 10. Such transfer of toner 18 to paper 20 upstream of the toner transfer zone and across a space between the belt and paper significantly reduces the quality of the latent image on the belt.

To significantly improve the image quality while retaining the ability to lift paper 20 from the toner transfer zone and stop paper movement while the image belt 10 continues to move at the end of a printing cycle, a dielectric shield 40 is provided in accordance with this invention. Shield 40 is mounted on a frame 41 to be held in an operative position in intimate contact with paper 20, preferably at point A precisely where paper 20 and belt 10 meet on the arcuate surface of roller 12A to form an upstream boundary of the wrap area or toner transfer zone. The dielectric shield 40 is shown supported independently of transfer corona 28 and accordingly may be separately moved to allow paper 20 to be lifted from belt 10. In the preferred embodiment, the dielectric shield 40 is comprised of a resilient elongated plate which will be understood to extend the width of the paper 20 to prevent minor discontinuties between the shield 40 and belt 10 which may cause irregularities in image quality. The shield 40 maintains contact engagement across the width of paper 20 in generally perpendicular relation to the direction of movement of the belt 10 and paper 20 and accordingly extends at least the dimension of any latent image to be transferred from belt 10 to paper 20.

More specifically, the dielectric shield 40 has an elongated resilient paper-engaging lip 40A at one end of its body 42 and a depending ear 44 at the opposite end of body 42 with the ear 44 connected by a pivot pin 46 to a shield lift arm 48 supported on frame 41 by a shaft 50. In the preferred form of this invention, the lip 40A may be formed of a resilient dielectric material made by E.I. duPont deNemours & Co., Inc. and sold under its trademark "Mylar". The body 42 may be formed of any suitable more rigid material.

Figure 3:
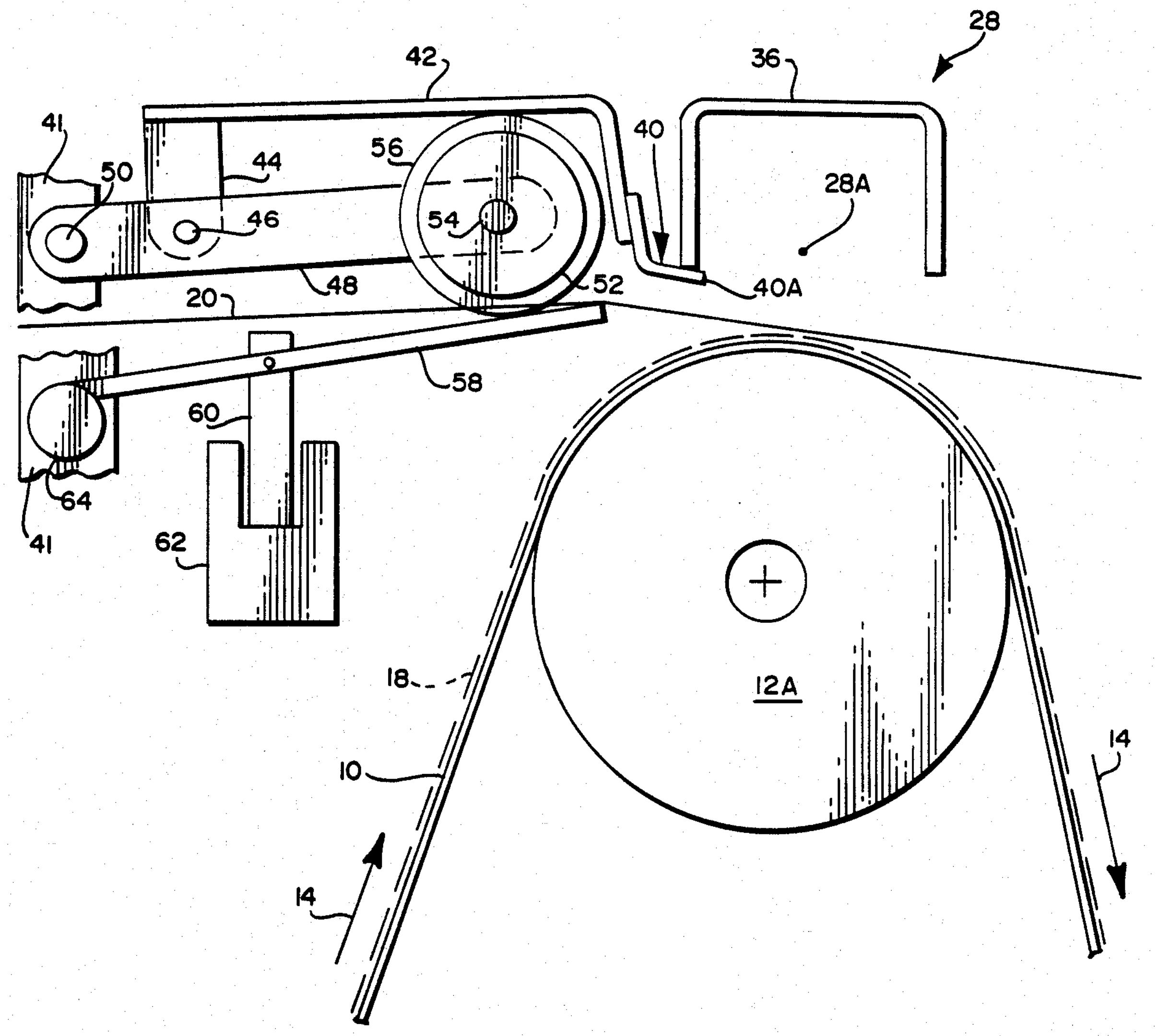
FIG. 3 is a side view of the transfer corona shield of FIG. 2 in a raised, inoperative position.

To tension the paper 20 coextensively over the belt 10 in the toner transfer zone, a paper tension roll 52 is shown supported for rotation on a pin 54 connected to an end of arm 48 opposite its mounting shaft 50. Pin 54 also supports a spacer roll 56 on arm 48 in coaxial relation to the paper tension roll 52 which will be understood to rotate independently of the spacer roll 56. The spacer roll 56 engages a free end of a power-operated paper lift arm 58 actuated by a plunger 60 of a solenoid 62 between a first or retracted position (FIG. 2) and a second or extended position (FIG. 3). Arm 58 is supported on shaft 64 mounted on the frame, not shown.

By virtue of the engagement between spacer roll 56 and the free end of the paper lift arm 58, arm 48 oscillates in following relation to movements of the paper lift arm 58. When solenoid plunger 60 and arm 58 are in a first or retracted position, the lip 40A of shield 40 is engaged in an operative position (FIG. 2) across the width of the paper, preferably at an upstream boundary (point A) of the toner transfer zone. When the solenoid plunger 60 and arm 58 are in a second or extended position (FIG. 3), the shield lip 40A is disengaged in a raised, inoperative position established by engagement of the shield 40 with the corona shell 36 whereby paper movement may be stopped, such as at the end of a printing cycle, while belt 10 continues to move.

Accordingly, during operation of the printer, the free end or lip 40A of the shield 40 meets the paper 20 along the toner transfer zone. The line of contact between the shield 40 and paper 20 extends perpendicularly across the path of movement of the paper sheet and defines the point along that line of motion at which paper 20 is exposed to the electirc field of the corona wire 28A.

By virtue of this construction, the shield 40 provides a resilient dielectric mateiral in contact with the paper strip directly under the transfer corona 28 in the printer at the point of contact (A) between the belt image surface and the paper 20 to shield the non-contact region upstream of the toner transfer zone from the electrical field of the corona 28. As will now be appreciated, such a construction effectively prevents premature toner transfer and promotes quality printing by minimizing the possibility of any resulting image degradation.

As will be apparent to persons skilled in the art, various modifications, adaptations and variations of the foregoing specific disclosure can be made without departing from the teaching of this invention.

I claim:

1. A transfer corona shield for a non-impact offset printer comprising a dielectric shield having a toner-carrying image surface, support means including an arcuate surface for supporting the dielectric belt for movement, feed means for feeding a continuous strip of paper along a path of paper movement in synchronism with the dielectric belt, the path of paper movement including a toner transfer zone wherein the belt and paper are in coextensively wrapped relation to the arcuate surface with the paper in intimate contact engagement with the toner-carrying image surface of the belt, a corona device in adjacent aligned relation to the toner transfer zone, the corona device providing an electric field for transferring toner from the belt to paper, and a shield between the corona device and the path of paper movement, the shield being movable into direct contact engagement with the paper across the paper's entire width in the toner transfer zone for completely blocking the corona electric field from an adjacent upstream non-contact region of paper being fed to the toner transfer zone.

2. The apparatus of claim 1 wherein the shield includes an elongated resilient lip.

3. The apparatus of claim 2 wherein the lip of the shield is formed of Mylar polyester material.

4. The apparatus of claim 1 wherein the support means, feed means, corona device and shield are mounted on a frame.

5. The apparatus of claim 1 wherein the shield is fixed to a shield support pivotally mounted on a frame.

6. The apparatus of claim 1 wherein the arcuate surface is defined by a wrap roll rotatably mounted on a frame in adjacent aligned relation to the transfer corona.

7. The apparatus of claim 1 further including a paper tension roll upstream of the arcuate surface and engageable with the paper for continuously maintaining intimate contact between the paper and the belt in the toner transfer zone.

8. The apparatus of claim 1 wherein the toner transfer zone has an upstream boundary defined by a point of tangency between the belt and paper located upstream of the corona device along the path of paper movement where the paper and belt first contact one another along said arcuate surface.

9. The apparatus of claim 8 wherein the toner transfer zone has a downstream boundary defined by a point wherein the paper separates from the belt downstream of the transfer corona.

10. The apparatus of claim 8 wherein the shield engages the paper at the upstream boundary of the toner transfer zone.

11. The apparatus of claim 1 further including a frame, a transfer corona shell fixed to the frame, a paper lift arm supported on the frame for movement between first and second positions, a shield lift arm mounted for pivoting movements on the frame between an operative position and a raised inoperative position in following relation to movements of the paper lift arm respectively between its first and second positions, the shield being mounted on the shield lift arm, the shield being in direct contact engagement with the paper in the toner transfer zone when the shield lift arm is in its operative position.

12. The apparatus of claim 11 wherein the shield engages the shell of the transfer corona for establishing the raised inoperative position of the shield lift arm when the paper lift arm is in its second position.

13. The apparatus of claim 12 wherein the paper is disengaged from the belt by the paper lift arm in its second position.

14. The apparatus of claim 13 wherein the shield is disengaged from the paper when the shield lift arm is in its raised inoperative position and the paper lift arm is in its second position.

15. The apparatus of claim 1 wherein said shield is constructed of a dielectric material.

* * * * *